United States Patent [19]
Fodor et al.

[11] Patent Number: 5,852,787
[45] Date of Patent: Dec. 22, 1998

[54] VEHICLE SUSPENSION CONTROL

[75] Inventors: Michael Glenn Fodor; Davorin D. Hrovat, both of Dearborn, Mich.

[73] Assignee: Ford Global Technologies, Inc., Dearborn, Mich.

[21] Appl. No.: 706,869

[22] Filed: Sep. 3, 1996

[51] Int. Cl.[6] .............................. G06F 17/00; G06F 7/00
[52] U.S. Cl. .................................. 701/6; 701/37; 701/38; 701/41; 280/124.1
[58] Field of Search ...................... 701/6, 37, 38, 701/41, 87, 70; 180/197, 271, 280; 280/124.1, 6.16, 91.1, 92

[56] References Cited

U.S. PATENT DOCUMENTS

| | | | |
|---|---|---|---|
| 4,827,416 | 5/1989 | Kawagoe et al. | 701/38 |
| 4,903,983 | 2/1990 | Fukushima et al. | 701/38 |
| 5,103,397 | 4/1992 | Ikemoto et al. | 364/424 |
| 5,183,127 | 2/1993 | Kageyama et al. | 180/197 |
| 5,294,146 | 3/1994 | Tabata et al. | 280/707 |
| 5,367,459 | 11/1994 | Shtarkman et al. | 364/424 |
| 5,771,479 | 6/1998 | Yamamoto et al. | 701/70 |

*Primary Examiner*—William A. Cuchlinski, Jr.
*Assistant Examiner*—Gertrude Arthur
*Attorney, Agent, or Firm*—Gregory P. Brown; Roger L. May

[57] ABSTRACT

Methods are provided for improving steering stability in a vehicle in which steering stability is a function of tire deflection. In one embodiment, a determination is made whether steering stability has been lost, and if so, the damping rate of all vehicle shock absorbers is increased, thereby reducing tire deflection and improving steering stability. In another embodiment, individual corner control is implemented such that the overall desired yaw torque and the yaw torque produced by an individual tire are determined and the shock absorber damping rate is adjusted accordingly for the respective tire to improve steering stability.

3 Claims, 5 Drawing Sheets

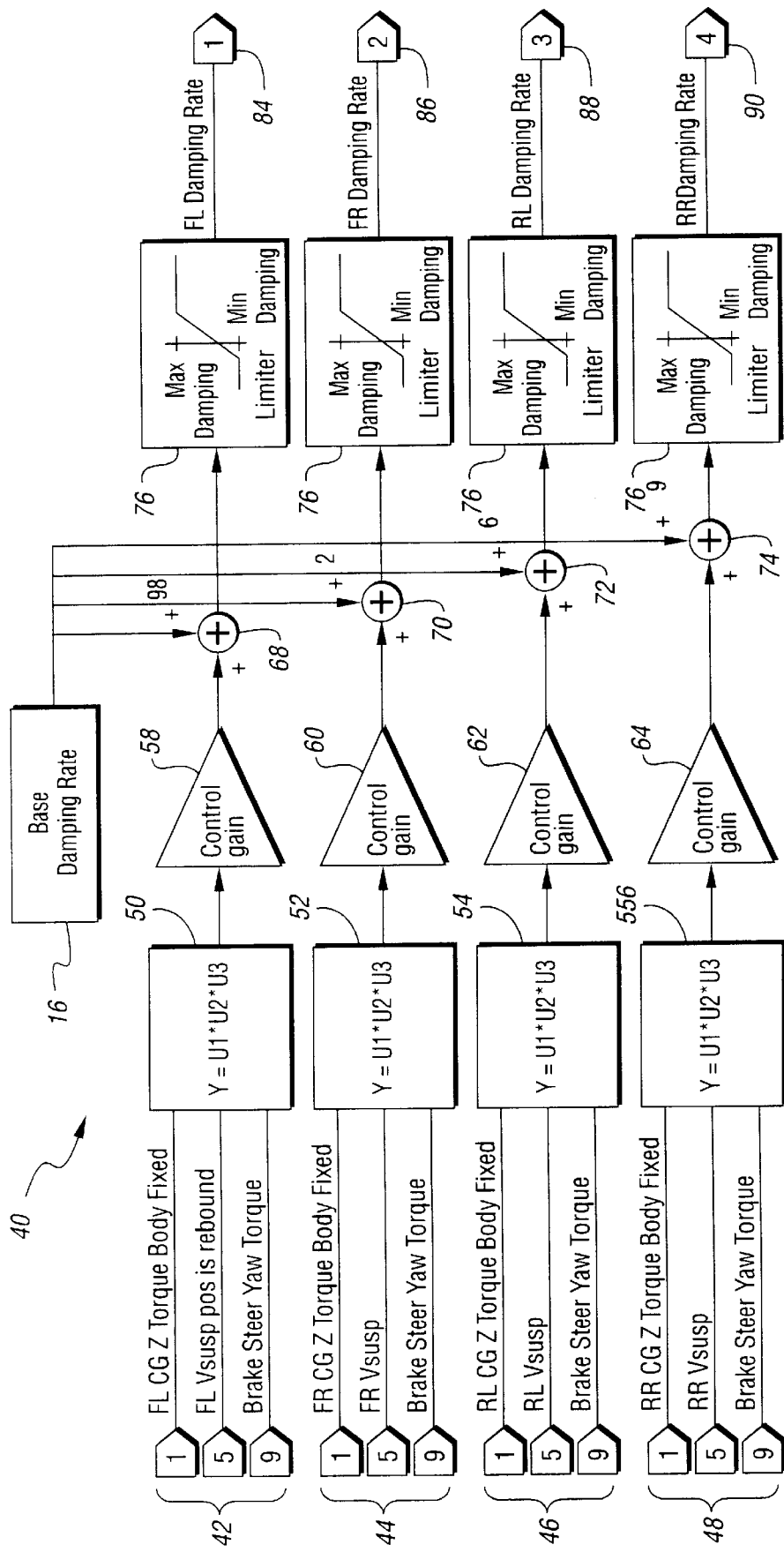

VEHICLE SUSPENSION CONTROL

TECHNICAL FIELD

The present invention relates to vehicle suspensions and, more particularly, to a method of controlling a vehicle suspension when steering stability has been lost.

BACKGROUND OF THE INVENTION

Many vehicles include systems for improving steering stability through brake intervention. Such systems are termed "brake steer", "interactive vehicle dynamics", "electronic stability program", "vehicle dynamic control", etc. In these systems, a determination is made regarding when the vehicle has lost steering stability and a microcontroller intervenes by actuating various brakes to assist the driver in regaining control of the vehicle.

It is desirable to further improve steering stability in such vehicles which utilize brake steer controls.

DISCLOSURE OF THE INVENTION

The present invention provides a method for improving steering stability in a vehicle in which steering stability is a function of tire deflection. The method comprises: 1) determining if steering stability has been lost; and 2) increasing the damping rate of all vehicle shock absorbers if it has been determined that steering stability has been lost, thereby reducing tire deflection and improving steering stability.

The present invention provides an alternative method of improving steering stability comprising: a) estimating lateral force acting on one of the tires; b) estimating longitudinal force acting on the one tire; c) determining total torque generated about the vehicle center of gravity based upon the estimated lateral and longitudinal forces on the one tire; d) measuring relative velocity of the respective hub with respect to the vehicle body, wherein hub movement toward the body is positive and away from the body is negative; e) determining the sign of the product of the predetermined desired torque, the determined total torque and the measured relative velocity; f) setting the respective damper to its highest damping rate if the determined sign is positive; g) setting the respective damper to its lowest damping rate if the sign is negative; and h) repeating steps a) through g) for the remainder of the tires.

The present invention also contemplates incrementally adjusting damping rate of the respective dampers based upon the sign of the product of the predetermined desired torque, the determined total torque, and the measured relative velocity of the respective hub with respect to the vehicle body and further based upon the magnitude of the relative velocity.

Accordingly, an object of the present invention is to provide a method of improving steering stability which comprises adjusting the damping rate of vehicle dampers when steering stability is lost.

The above object and other objects, features, and advantages of the present invention are readily apparent from the following detailed description of the best modes for carrying out the invention when taken in connection with the accompanying drawings.

BRIEF DESCRIPTION OF THE DRAWINGS

FIG. 6 shows a block diagram of a control scheme in accordance with the embodiment shown in FIG. 4.

BEST MODES FOR CARRYING OUT THE INVENTION

Figure 1:
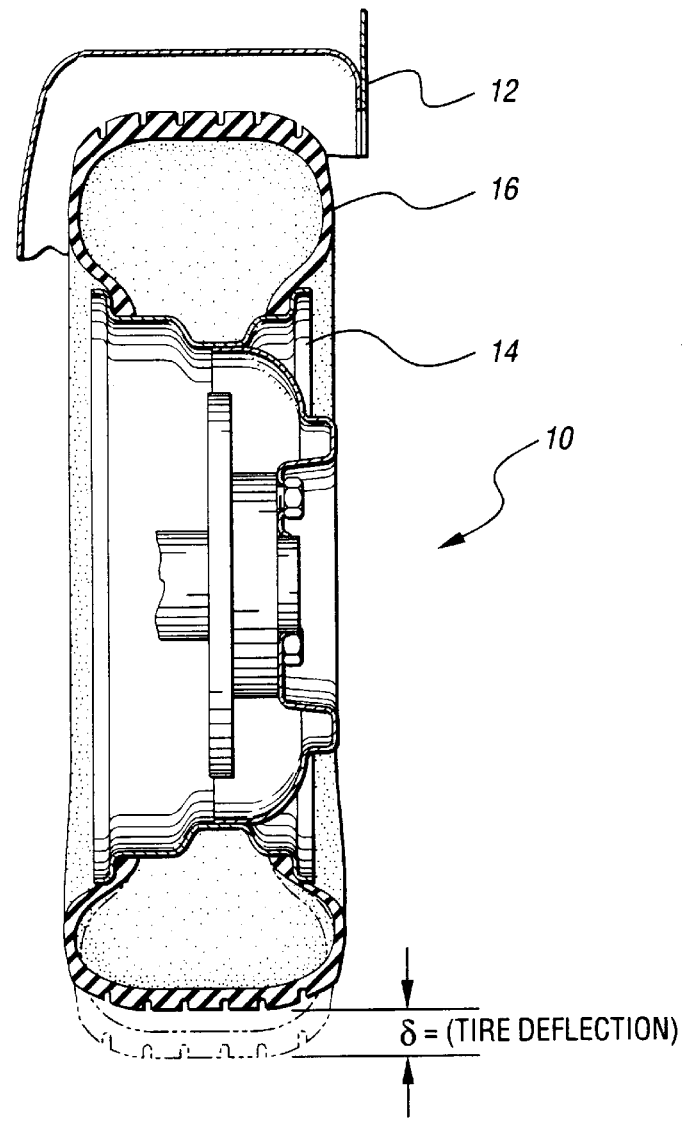
FIG. 1 shows a schematic cut-away sectional view of a vehicle wheel and body.

FIG. 1 shows a schematic cut-away sectional view of a vehicle wheel assembly 10 secured with respect to a vehicle body 12 in accordance with the present invention. The wheel assembly 10 includes a hub 14 and tire 16.

Vehicle steering stability is directly affected by the tire's ability to contact the road surface. Therefore, if the tire is particularly deflected or compressed, it may not adequately contact the road surface, thereby diminishing vehicle steering stability. Tire deflection δ is illustrated in FIG. 1 as the tire 16 is compressed with respect to the normal tire condition, as shown in phantom.

Figure 2:
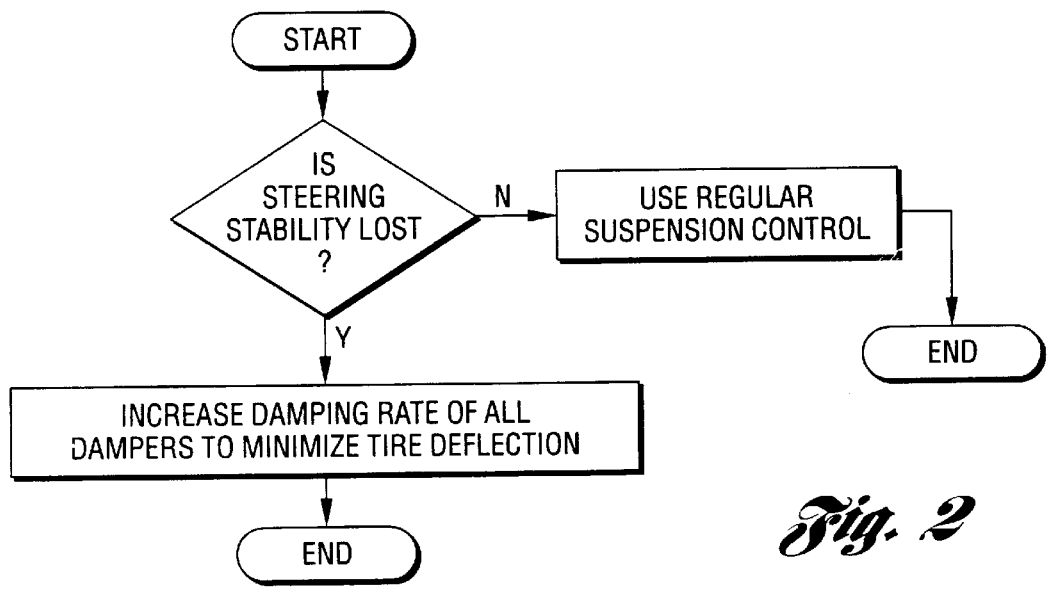
FIG. 2 shows a flow diagram of a method for improving steering stability in accordance with the present invention.

Turning to FIG. 2, a first method of improving steering stability is shown in accordance with the present invention. The method comprises first determining if steering stability has been lost, and if so, increasing the damping rate of all dampers (shock absorbers) in order to minimize tire deflection, thereby improving steering stability. The determination of whether steering stability has been lost may simply be a signal received from a brake steer controller, which is available on many vehicles.

This method relies on semi-active suspension to improve upon brake steer control. The semi-active suspension is used to exercise some control over tire normal forces which in turn effect lateral and longitudinal tire forces. The primary driver behind this method is the recognition that a tire produces a smaller average lateral force under a fluctuating normal force than it would under a constant normal force. This is due both to the relaxation of the tire carcass as it rotates and the non-linear relationship between lateral force and normal force. By minimizing tire deflection, normal force excursion is minimized and the tire produces an effectively larger lateral force, thereby improving vehicle handling.

This method is investigated using a four tire vehicle model with independent suspensions at each corner and a tire model which contains the effects mentioned above. A standard test is used in which the car, steered by a driver model, is subjected to a side wind (11.375 meters per second for a time between 0.5 and 4 seconds) and then transitions from a high friction ($\mu$=0.9) to a low friction ($\mu$=0.1) rough road. In this test, the vehicle is traveling on a level grade with a traction control system engaged. The traction control system adjusts tire slip in an attempt to maintain a constant speed of 18 meters per second. The test is conducted for two control configurations. The first configuration (configuration A illustrated in FIG. 3) includes low suspension damping (900 Ns/m). The second illustration (illustrated as "B" in FIG. 3) uses a high suspension damping (3200 Ns/m).

Figure 3:
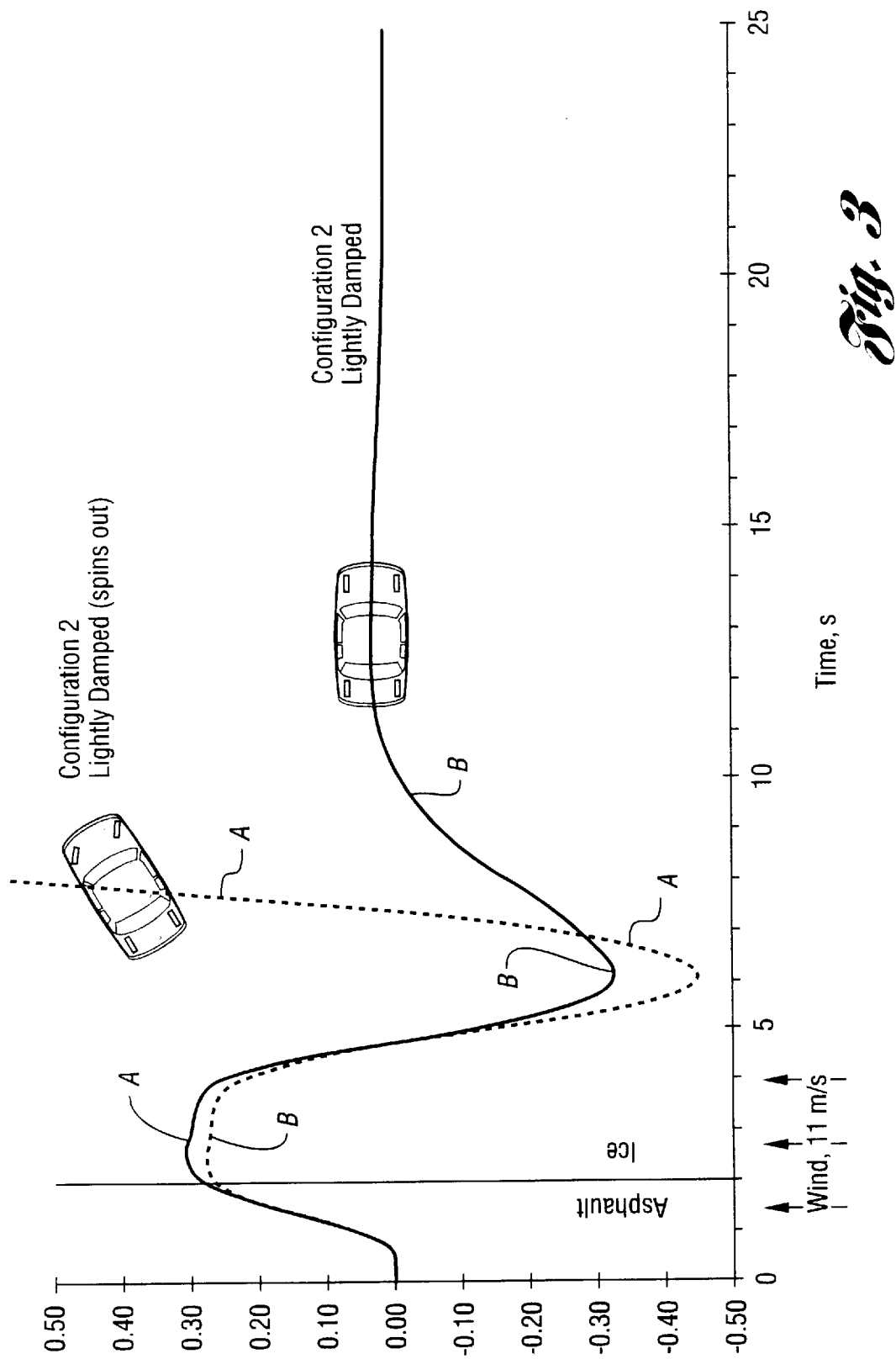
FIG. 3 shows a schematic graph illustrating vehicle behavior in accordance with the present invention.

FIG. 3 shows the vehicle's lateral position for each configuration. Configuration A is unstable for this test. Increasing the damping rate (configuration 2) lowers the initial lateral excursion and fully stabilizes the driver/vehicle response. RMS tire deflections for the test are presented below. Damping rates were chosen to provide a reasonable difference between corresponding RMS deflections, and the 3200 Ns/m rate minimizes RMS deflection for this vehicle.

| Configuration | Damping Rate | RMS Tire Deflection |
| --- | --- | --- |
| A | 900 Ns/m | 6.57 mm |
| B | 3200 Ns/m | 4.06 mm |

Using this method, the dampers are preferably adjusted to a predetermined damping rate which minimizes tire deflection. In this manner, steering stability may more readily be regained.

Figure 4:
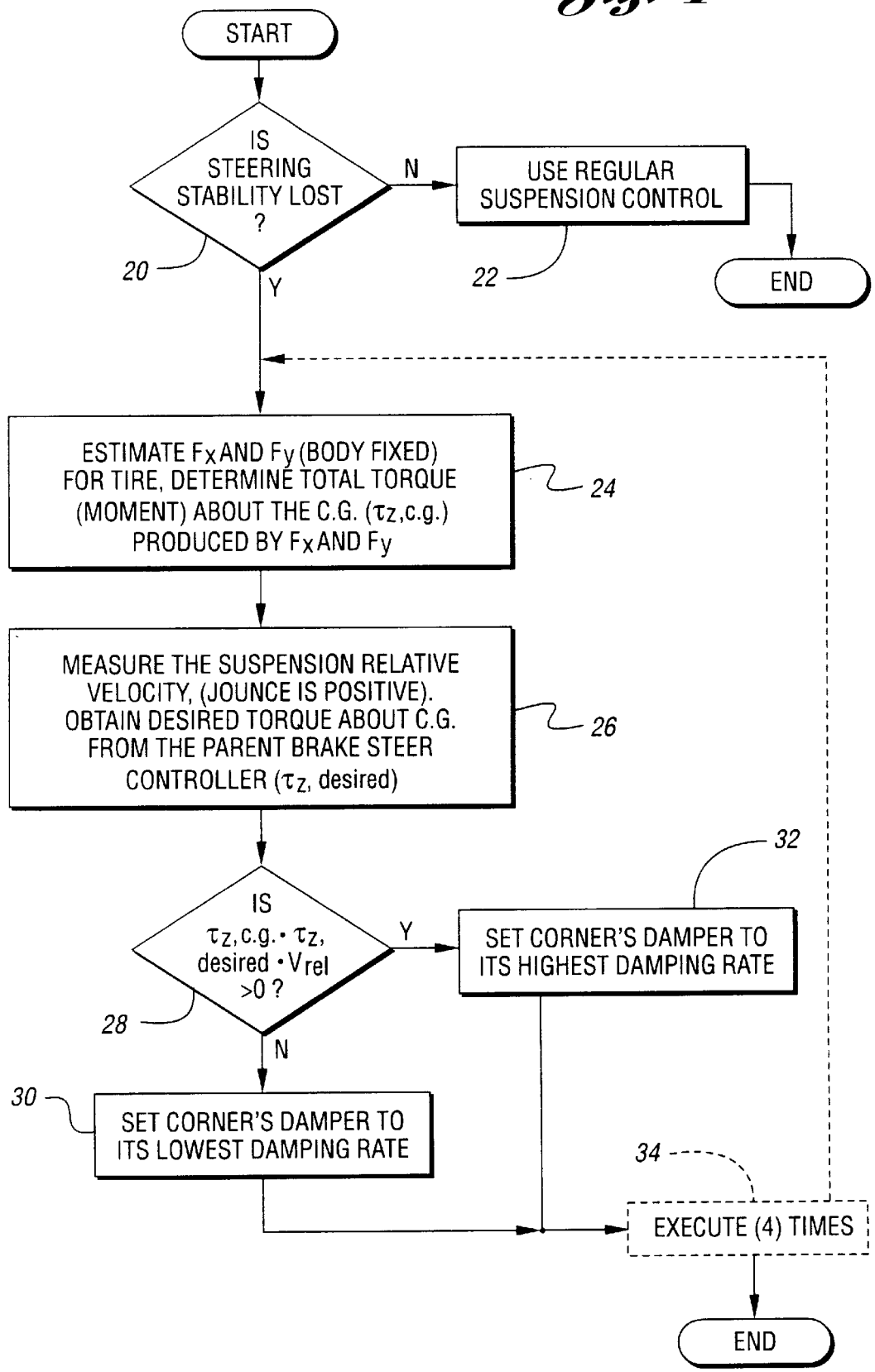
FIG. 4 shows a flow diagram of a method for improving steering stability in accordance with an alternative embodiment of the present invention.

Turning to FIG. 4, an alternative method of improving steering stability in a vehicle is illustrated. This method is an individual corner control method. Its purpose is to coordinate the vehicle center of gravity yaw torques produced by the individual tires by increasing or decreasing individual corner damping.

As shown in FIG. 4, the first step (step 20) is to determine if steering stability has been lost. If steering stability has not been lost, then regular suspension control is used (step 22). If steering stability has been lost, then the lateral and longitudinal tire forces $F_x$ and $F_y$ are estimated and the total torque ($\tau_{z, c.g.}$) about the center of gravity due to these forces is determined based upon $F_x$ and $F_y$ (step 24). The next step is to measure the suspension relative velocity ($V_{rel}$), which is the velocity of the hub of the wheel with respect to the vehicle body (step 26). $V_{rel}$ is positive when the wheel is in jounce (i.e., the hub is moving toward the body), and negative in rebound (i.e., the hub is moving away from the body). The desired torque about the center of gravity is then obtained from the parent brake steer controller ($\tau_{z, desired}$).

Next, the product of the determined total torque ($\tau_{z, c.g.}$), the desired torque about the center of gravity ($\tau_{z, desired}$) and the relative velocity ($V_{rel}$) is determined (step 28). If the product is greater than zero, then the corner's damper is set to its highest damping rate (step 30). If the product is less than zero, then the corner's damper is set to its lowest damping rate (step 32). This method is executed four times (step 34), once for each wheel, continuously at regular time intervals.

Figure 5:
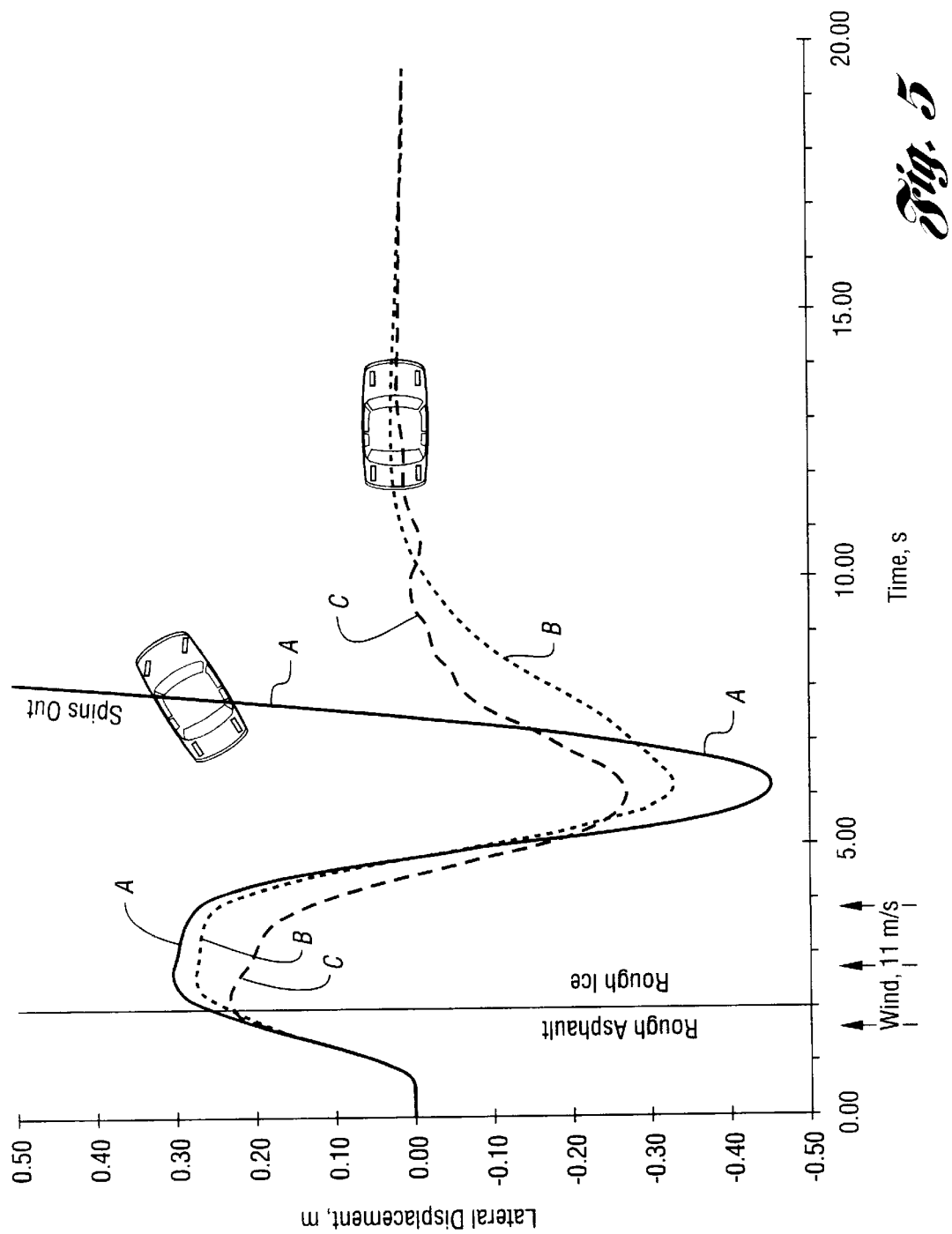
FIG. 5 shows a schematic graph illustrating vehicle behavior in accordance with the alternative embodiment shown in FIG. 4.

Turning to FIG. 5, this alternative method is illustrated as configuration C. The details of the test are as follows. The car, steered by a driver model, is subjected to a side wind (11.375 meters per second for a time between 0.5 and 4 seconds) and then transitions from a high friction ($\mu$=0.9) to a low friction ($\mu$=0.1) rough road. In this test, the vehicle is traveling on a level grade with a traction control system engaged. The traction control system adjusts tire slip in an attempt to maintain a constant speed of 18 meters per second. As shown in FIG. 5, the vehicle performs better using this method as opposed to the method described above with reference to FIG. 2.

Using this configuration, if the sign of the overall desired yaw torque (produced by the brake steer controller) and the yaw torque produced by an individual tire are of the same sign, the damping rate at the corner is increased if the corner is in jounce, and decreased if the corner is in rebound. If the desired torque and corner torque are of opposing sign, the corner damping rate is decreased in jounce and increased in rebound. Thus, all corner yaw torques which would augment the overall desired yaw torque are increased by increasing the individual corner tire normal force, and all corner yaw torques which would diminish the overall desired yaw torque are decreased by decreasing the individual corner tire normal force.

A controller 40 operative to accomplish the method of FIG. 4 is shown in FIG. 6. As shown, the desired overall yaw torque, individual corner yaw torque, and individual corner suspension relative velocity are multiplied together for each tire 42, 44, 46, 48 at the respective multiplier block 50, 52, 54, 56. Each product is then multiplied by a tunable gain 58, 60, 62, 64. The resulting product is added to a base damping rate 66 at the adder blocks 68, 70, 72, 74, and clipped at the respective limiter block 76, 78, 80, 82 to a maximum/minimum damping rate, and then used as the desired corner damping rate for the respective damper 84, 86, 88, 90.

While the best modes for carrying out the invention have been described in detail, those familiar with the art to which this invention relates will recognize various alternative designs and embodiments for practicing the invention within the scope of the appended claims.

Alternatively, the damping rates could be adjusted further based upon the magnitude of the measured relative velocity.

What is claimed is:

1. A method for improving steering stability in a vehicle in which steering stability is a function of tire deflection, the vehicle including a plurality of wheels, each wheel having a tire, a hub, and an adjustable damper, and the vehicle having a center of gravity and a brake steer controller which provides a desired torque, the method comprising:

a) estimating lateral force acting on one of the tires;

b) estimating longitudinal force acting on said one tire;

c) determining total torque generated about the center of gravity based upon the estimated lateral and longitudinal forces on said one tire;

d) measuring relative velocity of the respective hub with respect to the vehicle body, wherein hub movement toward the body is positive and away from the body is negative;

e) determining the sign of the product of the desired torque, the determined total torque and the measured relative velocity;

f) setting the respective damper to its highest damping rate if the determined sign is positive;

g) setting the respective damper to its lowest damping rate if said sign is negative; and h) repeating steps a) through g) for the remainder of said plurality of tires.

2. A method for improving steering stability in a vehicle in which steering stability is a function of tire deflection, the vehicle including a plurality of wheels, each wheel having a tire, a hub, and an adjustable damper, and the vehicle having a center of gravity and a brake steer controller which provides a desired torque, the method comprising:

a) estimating lateral force acting on one of the tires;

b) estimating longitudinal force acting on said one tire;

c) determining total torque generated about the center of gravity based upon the estimated lateral and longitudinal forces on said one tire;

d) measuring relative velocity of the respective hub with respect to the vehicle body, wherein hub movement toward the body is positive and away from the body is negative;

e) determining the sign of the product of the desired torque, the determined total torque and the measured relative velocity;

f) adjusting the damping rate of the respective damper based upon said sign; and g) repeating steps a) through f) for the remainder of said plurality of tires.

3. The method of claim 2, wherein said step of adjusting damping rate comprises:

setting the respective damper to its highest damping rate if the sign of said product is positive; and setting the respective damper to its lowest damping rate if the sign of said product is negative.

* * * * *